(12) United States Patent
Sugimoto et al.

(10) Patent No.: US 8,457,204 B2
(45) Date of Patent: Jun. 4, 2013

(54) OBJECTIVE PERCEPTUAL VIDEO QUALITY EVALUATION APPARATUS

(75) Inventors: Osamu Sugimoto, Saitama (JP); Shigeyuki Sakazawa, Saitama (JP); Atsushi Koike, Saitama (JP)

(73) Assignee: KDDI Corporation, Tokyo (JP)

( * ) Notice: Subject to any disclaimer, the term of this patent is extended or adjusted under 35 U.S.C. 154(b) by 1708 days.

(21) Appl. No.: 11/830,599

(22) Filed: Jul. 30, 2007

(65) Prior Publication Data

US 2008/0025400 A1 Jan. 31, 2008

(30) Foreign Application Priority Data

Jul. 31, 2006 (JP) ................. 2006-208091

(51) Int. Cl.
*H04N 7/12* (2006.01)
*H04N 11/02* (2006.01)
*H04N 11/04* (2006.01)

(52) U.S. Cl.
USPC ............... 375/240.16; 375/240; 375/224

(58) Field of Classification Search
USPC ...................................... 375/240.16
See application file for complete search history.

(56) References Cited

U.S. PATENT DOCUMENTS

| | | | |
|---|---|---|---|
| 6,239,834 B1 * | 5/2001 | Miyaji et al. | 348/193 |
| 2002/0071614 A1 * | 6/2002 | Ali et al. | 382/278 |
| 2006/0152585 A1 * | 7/2006 | Bourret et al. | 348/180 |

FOREIGN PATENT DOCUMENTS

JP 2006074333 A * 3/2006

OTHER PUBLICATIONS

Machine Translation of JP 2006074333.*
ITU-T Recommendation J.143, "User Requirements for Objective Perceptual Video Quality Measurements in Digital Cable Television", May 2000.
ITU-T Recommendation J.144, "Objective Perceptual Video Quality Measurements Techniques for Digital Cable Television in the Presence of a Full Reference", Mar. 2001.

* cited by examiner

*Primary Examiner* — Edward Zee
*Assistant Examiner* — Yogesh Paliwal
(74) *Attorney, Agent, or Firm* — Westerman, Hattori, Daniels & Adrian, LLP (57) ABSTRACT

A feature amount extracting unit extracts a block distortion degree of an evaluated video y relative to an original video x, a PSNR overall temporal fluctuation degree, and a PSNR local temporal fluctuation degree as feature amounts. A weighted sum calculating unit calculates a weighted sum of these feature amounts, and calculates an objective video quality index. Frame rate detecting unit detects frame rate of the evaluated video y. A correcting unit corrects the objective video quality index based on the frame rate detected by the frame rate detecting unit. An objective evaluation index-subjective video quality mapping unit applies the corrected objective video quality index $Q_{obj}$ to a correlation between an objective video quality index and a subjective video quality given in advance, thereby deriving a subjective video quality estimated value DMOS.

5 Claims, 6 Drawing Sheets

(LINEAR CHARACTERISTIC)

Fig. 4

(SIGMOID FUNCTION)

Fig. 5

(DEFINITION ON PSNR LOCAL DEGRADATION)

Fig. 6

(CHARACTERISTIC OF $Q_{obj}$-DMOS (SUBJECTIVE EVALUATION MEASURE TO OBJECTIVE EVALUATION MEASURE) FOR EVERY FRAME RATE)

Fig. 7

(CORRECTION METHOD)

CHARACTERISTIC OF $Q_{obj}$ - DMOS AFTER CORRECTION ON FRAME RATE

OBJECTIVE PERCEPTUAL VIDEO QUALITY EVALUATION APPARATUS

BACKGROUND OF THE INVENTION

1. Field of the Invention

The present invention relates to an objective perceptual video quality evaluation apparatus for automatically evaluating quality of a video, e.g., a received video image or a reproduced video image which is transmitted or accumulated after being subjected to an image processing such as compression coding without relying on subjective human judgment.

2. Description of the Related Art

There are conventionally known techniques related to the present invention as disclosed in, for example, ITU-T Recommendation J.143, "User requirements for objective perceptual video quality measurements in digital cable television" and ITU-T Recommendation J.144, "Objective perceptual video quality measurement techniques for digital cable television in the presence of a full reference".

The ITU-T Recommendation J.143 mainly describes user requirements for automatic objective perceptual video quality measurements in television transmission. For the objective measurements, three frameworks of "Full Reference", "Reduced Reference", and "No Reference" are provided for, depending on how to use video signals before and after transmission. It is described how to apply one of the frameworks to a system according to purposes of use. For example, the "Full Reference" framework is generally to be used for measurement of quality of compression-coded video signal, and the "Reduced Reference" and "No Reference" frameworks are generally to be used for measurements of reception quality of a transmitted video signal. The ITU-T Recommendation J.143 there by shows user requirements for automatic objective perceptual video quality measurements.

The ITU-T Recommendation J.144 is a recommendation of "Pull Reference"-based automatic objective perceptual video quality measurements on the premise of a quality of a standard television video signal for secondary distribution. The "secondary distribution" refers to transmission of videos mainly between a television station and each viewer. As the other categories than the secondary distribution, primary distribution referring to delivery of program materials between television stations and material transmission for providing materials for such programs as sports and news programs are present. While the ITU-T Recommendation J.143 describes only the system frameworks, the ITU-T Recommendation J.144 describes specific techniques for quality measurements.

The "Full Reference"-based video quality measurement techniques disclosed in the ITU-T Recommendation J.144 attain the quality verified as the ITU recommendation. However, the techniques disclosed therein are based on the secondary distribution of video signals according to a standard television system. The standard television system means that with NTSC (525/60), a signal format is 720 pixels×486 lines and 30 frames per second (interlace scan mode) and with PAL (625/50), a signal format is 720 pixels×576 lines and 25 frames per second (interlace scan mode).

In case of the secondary distribution, bit rates allocated to the video compression coding, i.e., a television transmission band is assumed as about one to four Mbps. Furthermore, the available compression coding is mainly assumed as MPEG-2 scheme.

Meanwhile, as multimedia applications typified by those for IP broadcasting on the Internet and terrestrial digital one-segment broadcasting in the cellular telephone network have become popular, demand for evaluation of qualities of videos transmitted by these applications similarly to that of video qualities of television transmission videos rises.

As stated, the recommendation disclosed in the ITU-T Recommendation J.144 is on the premise of the television quality. Due to this, the techniques disclosed therein are incapable of ensuring high accuracy for videos obtained by compressing videos at low resolution and a low frame rate (e.g., 15 frames/second, 10 frames/seconds or 6 frames/second) using high compression coding such as MPEG-4/H.264 at low bit rate. Therefore, a technique for automatic objective perceptual video quality evaluation intended at these multimedia applications is desired.

SUMMARY OF THE INVENTION

It is an object of the present invention to provide an objective perceptual video quality evaluation apparatus capable of automatically and objectively evaluating quality of a video intended at a multimedia application or the like without relying on subjective human judgment.

In order to achieve the object, the present invention is characterized in that a video quality objective perceptual evaluation apparatus for estimating a subjective video quality by analyzing two types of video signals of an original video and an evaluated video comprises a feature amount extracting unit for extracting a block distortion degree of the evaluated video relative to the original video, a PSNR overall temporal fluctuation degree for frames in a sequence, and a PSNR local temporal fluctuation degree for each of the frames as feature amounts, an objective video quality index calculating unit for calculating a weighted sum of the block distortion degree, the PSNR overall temporal fluctuation degree, and the PSNR local temporal fluctuation degree, and calculating an objective video quality index, frame rate detecting unit for detecting frame rate of the evaluated video, a correcting unit for correcting the objective video quality index calculated by the objective video quality index calculating unit based on the frame rate detected by the frame rate detecting unit, and a subjective video quality estimated value deriving unit for deriving a subjective video quality estimated value by applying the objective video quality index corrected by the correcting unit to a correlation between the subjective video quality index and the objective video quality given in advance.

According to the present invention, the block distortion degree of the evaluated video relative to the original video, the PSNR overall temporal fluctuation degree, and the PSNR local temporal fluctuation degree are extracted as feature amounts. The objective video quality index is calculated based on the feature amounts and is corrected for every frame of the evaluated video, then the evaluation value reflecting the characteristic of the low frame rate video is derived. Therefore, it is possible to realize highly accurate and automatic evaluation of the video qualities of multimedia videos at low resolution and low frame rate, which evaluation has been difficult to make by the conventional television image evaluation method.

In addition, objective perceptual video quality evaluation of the multimedia videos at low resolution and low frame rate may be executed without relying on subjective human judgment.

DETAILED DESCRIPTION OF THE PREFERRED EMBODIMENT

Figure 1:
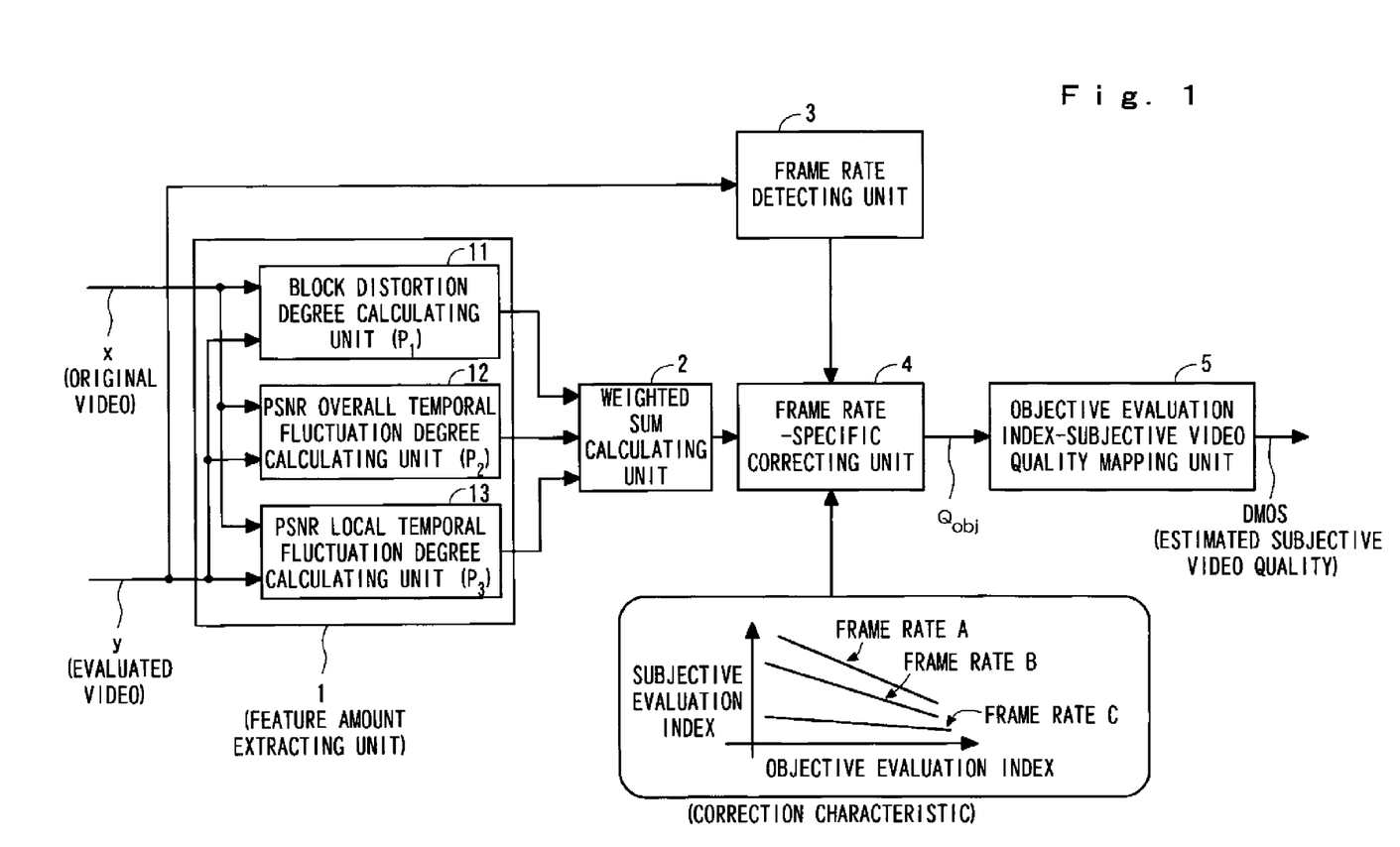
FIG. 1 is a block diagram showing a schematic configuration of an objective perceptual video quality evaluation apparatus according to an embodiment of the present invention.

Preferred embodiments of the present invention will be described hereinafter in detail with reference to the accompanying drawings. FIG. 1 is a block diagram of an automatic objective perceptual video quality evaluation apparatus according to an embodiment of the present invention. The automatic objective perceptual video quality evaluation apparatus receives two types of video signals, and analyzing the video signals, thereby finally outputting a subjective video quality estimated value. Meanwhile, an image corresponding to a video signal before being subjected to video-transmission-related image processing is denoted by "original video x", and an image corresponding to a received transmission image and to be subjected to evaluation of a subjective quality according to the present invention is denoted by "evaluated video y".

As shown in FIG. 1, the automatic objective perceptual video quality evaluation apparatus according to the embodiment comprises computer based digital image processor to do image processing such as compression coding and the digital image processor is configured to include a feature amount extracting unit 1 (or a feature amount extracting processor unit 1), a weighted sum calculating unit (or a weighted sum calculating processor unit or an objective perceptual video quality index calculating processor unit) 2, frame rate detecting unit 3 (or a frame rate detecting processor unit 3), frame rate-specific correcting unit 4 (or a frame rate-specific correcting processor unit 4), and an objective evaluation index-subjective video quality mapping unit (or an objective evaluation index-subjective video quality mapping processor unit or a subjective perceptual video quality estimated value deriving processor unit) 5. The feature amount extracting unit 1 is divided into functional units of a block distortion degree calculating unit 11, a PSNR (pixel to noise ratio) overall temporal fluctuation degree calculating unit 12, and a PSNR local temporal fluctuation degree calculating unit 13. The computer based digital image processor may comprise a central processing unit (CPU), a computer, a computer unit, a data processor, a microcomputer, microelectronics device, or a microprocessor.

A configuration or function of each of the constituent elements of the automatic objective perceptual video quality evaluation apparatus according to the embodiment will be described in detail.

<Feature Amount Extracting Unit 1>

The feature amount extracting unit 1 extracts three video feature amounts necessary to derive a subjective video quality, that is, a block distortion degree $P_1$, a PSNR overall temporal fluctuation degree $P_2$, and a PSNR local temporal fluctuation degree $P_3$. A method of deriving each of the video feature amounts will be described.

1. Block Distortion Degree $P_1$

Figure 2:
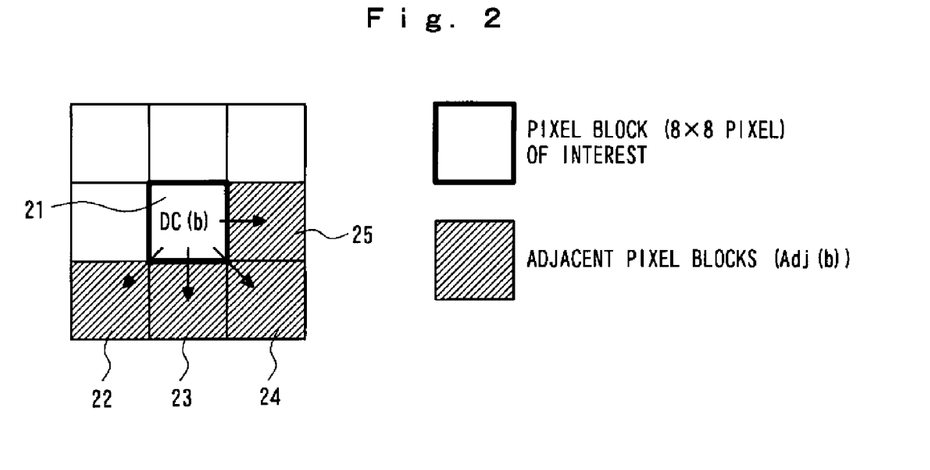
FIG. 2 is a schematic diagram explaining a method of calculating a block DC difference.

The block distortion degree calculating unit 11 calculates an intra-frame average dDC(f) of a DC difference between a pixel block 21 of an arbitrary size shown in FIG. 2 (8×8 pixel block in FIG. 2) and four adjacent blocks (a neighboring pixel block 25 on the right hand, a pixel block 22 on the lower left hand, a pixel block 23 under the pixel block 21, and a pixel block 24 on the lower right hand) for each of the original video x and the evaluated video y. Further, the block distortion degree calculating unit 11 calculates a difference between the intra-frame averages dDC(f) for the original video x and the evaluated video y, calculates a difference between an intra-sequence maximum value and an intra-sequence minimum value of the difference, and defines the difference as the block distortion degree $P_1$. In the present specification, the term "sequence" means entirety of the original video x or evaluated video y used for a video quality evaluation, and the video quality evaluation is generally made on video for 5 to 15 seconds.

$$P_1 = \max\{dDC_{Ref}(f) - dDC_{Cod}(f)\} - \min\{dDCK_{Ref}(f) - dDC_{Cod}(f)\}$$

In the equation, $dDC_{Ref}(f)$ denotes the intra-frame average of the DC difference for the original video x, and $dDC_{Cod}(f)$ denotes the intra-frame average of the DC difference for the evaluated video y. In the example shown in FIG. 2, the intra-frame average of the DC difference dDC(f) can be represented by the following Equation (1). In the Equation (1), $N_B$ denotes a total of pixel blocks in a frame.

$$dDC(j) = \sum_{b \in frame} \sum_{i \in Adj(b)} |DC(b) - DC(i)|/4/N_B \quad \text{Equation (1)}$$

2. PSNR Overall Temporal Fluctuation Degree $P_2$

The PSNR overall temporal fluctuation degree $P_2$ is calculated using a maximum value, a minimum value, and an average value of an intra-sequence power error MSE (mean square error).

First, the maximum value, the minimum value, and the average value of the MSE between the original video x and the evaluated video y are defined. If the maximum value, the minimum value, and the average value of the MSE are denoted by $e_{min}$, $e_{max}$, and $e_{ave}$, respectively, they are defined as represented by the following Equation (2).

$$MSE(f) = \sum_{n \in frame} \{x_{Ref}(f, n) - xCod(f, n)\}/N_P \quad \text{Equation (2)}$$

$$e_{min} = \min\{MSE(f) \mid f \in \text{sequence}\}$$

$$e_{max} = \max\{MSE(f) \mid f \in \text{sequence}\}$$

$$e_{ave} = \sum_{f \in sequence} MSE(f) \bigg| N_F$$

In the Equation (2), x(f, n) denotes a signal value of an $n^{th}$ pixel in the frame f, $N_p$ denotes the number of pixels in the frame, and $N_f$ denotes the number of frames in a sequence. For example, if a video quality for ten seconds in which frames are updated 15 times per second is to be evaluated, the number of frames in the sequence is 150. If the sequence of the original video x and that of the evaluated video y differ in frame rate, then corresponding frames are detected by means such as frame matching means, and a PSNR between the corresponding frames is derived.

Next, the PSNR overall temporal fluctuation degree $P_2$ based on the maximum value $e_{max}$, the minimum value $e_{min}$, and average value $e_{ave}$ is calculated. As stated, the PSNR is significant information for estimating the subjective video quality. However, it is confirmed that the correlation between the objective video quality index and the subjective video quality tends to decrease if only the intra-sequence average value is used while the video quality has great temporal fluctuation in the sequence. Therefore, the PSNR overall temporal fluctuation degree $P_2$ is defined as represented by the following Equation (3) according to deviations of the maximum value $e_{max}$ and the minimum value $e_{min}$ from the average value $e_{ave}$ of the intra-sequence power error.

$$P_2 = \log\left|\frac{e_{max} - e_{ave}}{e_{ave} - e_{min}}\right| \times f(e_{ave}) \qquad \text{Equation (3)}$$

In the Equation (3), $f(e_{ave})$ denotes a scaling function for changing a value according to the average value $e_{ave}$ of the intra-sequence average MSE. As to the scaling function $f(e_{ave})$, an arbitrary function monotonically increasing in all ranges of the average value $e_{ave}$ (which are, however, substantially in an range $e_{ave}>0$ according to the definition of $e_{ave}$) is available. Examples of the scaling function $f(e_{ave})$ include following functions.

Linear Characteristic Function

Figure 3:
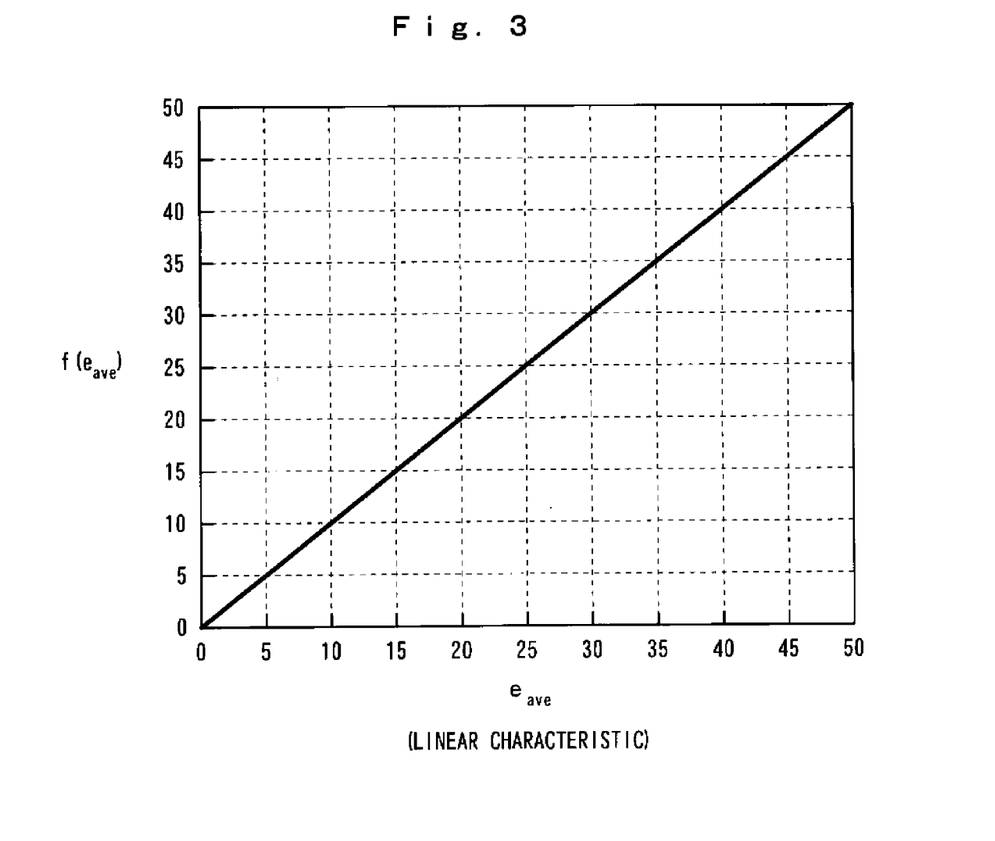
FIG. 3 is a graph showing an example of a linear characteristic.

The linear characteristic function is defined as $f(e_{ave})$ $e_{ave}$. A linear characteristic thereof is that shown in FIG. 3.

Sigmoid Function

The sigmoid function has a characteristic of saturating in a high $e_{ave}$ part and a low $e_{ave}$ part. The sigmoid function is defined as represented by the following Equation (4).

$$f(e_{ave}) = \frac{b_1}{1 + e^{-b_2(e_{ave}-b_3)}} + b_4 \qquad \text{Equation (4)}$$

Figure 4:
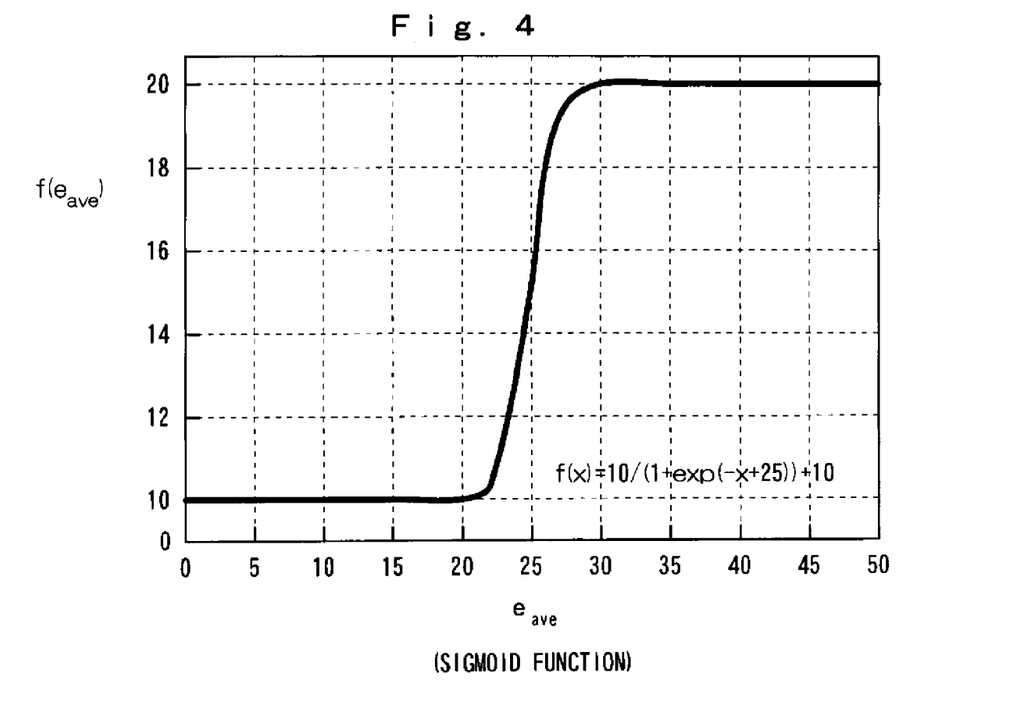
FIG. 4 is a graph showing a sigmoid function that is another example of the linear characteristic.

The sigmoid function has a characteristic shown in FIG. 4. In FIG. 4, $b_1=10$, $b_2=1$, $b_3=25$, and $b_4=10$.

As can be seen from the property that the function $f(e_{ave})$ monotonically increases, the following effect can be produced according to a term of the function $f(e_{ave})$. If the average value $e_{ave}$ is small, that is, the average MSE is small and the video quality of the evaluated video is high, the PSNR overall temporal fluctuation degree $P_2$ is decreased. If the average value $e_{ave}$ is large and the video quality of the evaluated video is low, the PSNR overall temporal fluctuation degree $P_2$ is increased. Furthermore, if the sigmoid function is used as the scaling function $f(e_{ave})$, the property of saturating to certain values in regions on both ends shown in FIG. 4 can be added to the linear characteristic of the scaling function. The property may be regarded as a characteristic that reflects the saturation characteristic of human visual perception.

3. PSNR Local Temporal Fluctuation Degree $P_3$

The low rate coding intended at multimedia applications tends to generate temporally local degradations in PSNR resulting from key frame insertion, scene change, occurrence of a sudden motion or the like. Due to this, degradations in the subjective video quality caused by these local degradations are detected based on the PSNR local temporal fluctuation degree $P_3$.

Figure 5:
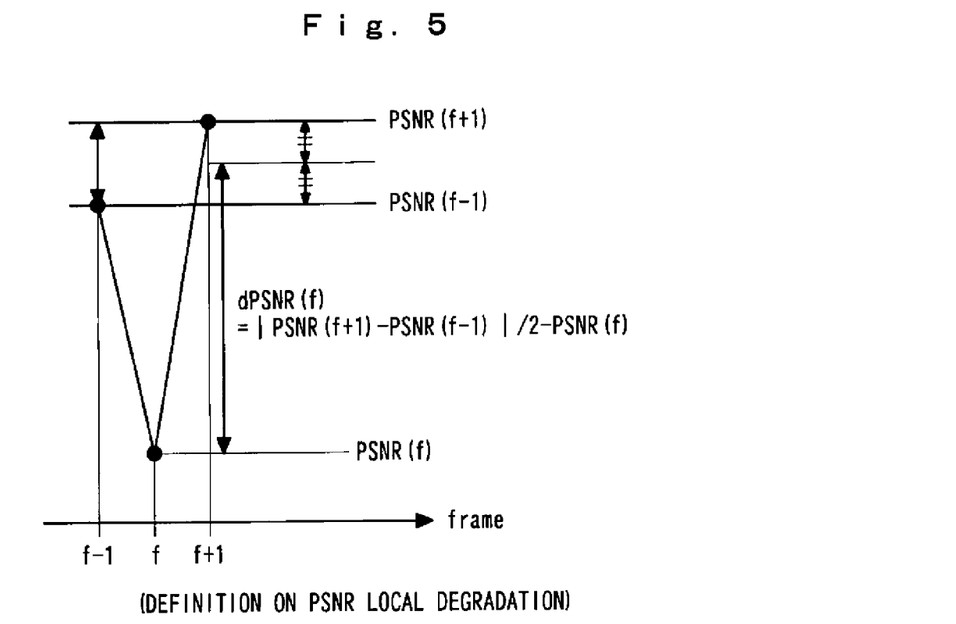
FIG. 5 is a schematic diagram showing definition of PSNR local degradation.

As shown in FIG. 5, a V-shaped temporal change dPSNR(f) of the PSNR is calculated, and the dPSNR(f) is defined as the PSNR local temporal fluctuation degree $P_3$. Specifically, if an index (a frame number) of a frame of interest is f, an absolute value of a difference between an average PSNR of the frames f−1 and f+1 before and after the frame f and the PSNR value of the frame f is defined as the dPSNR(f). A maximum value of the dPSNR(f) in the sequence is calculated and the calculated maximum value is defined as the PSNR local temporal fluctuation degree $P_3$.

$$P_3 = \max\{dPSNR(f)|f \in \text{sequence}\} \qquad \text{Equation (5)}$$

The PSNR local temporal fluctuation degree $P_3$ may be multiplied by a scaling function for changing a value according to the MSE of the frame f. As this scaling function, an arbitrary function that monotonically decreases according to the MSE is applicable.

<Weighted Sum Calculating Unit 2>

An objective evaluation index $Q_{obj}$ is defined as represented by the following equation using a weighted sum of the above-stated objective evaluation measures $P_1$, $P_2$, and $P_3$.

$$Q_{obj} = \alpha P_1 + \beta P_2 + \gamma P_3$$

In the equation, symbols $\alpha$, $\beta$, and $\gamma$ denote weight parameters. The weight parameters $\alpha$, $\beta$, and $\gamma$ are selected so that an estimated error of the objective video quality from the subjective video quality becomes minimum when the objective evaluation index $Q_{obj}$ is subjected to conversion processings by the frame rate-specific correcting unit 4 and the objective evaluation index-subjective video quality mapping unit 5. For example, the weight parameters $\alpha$, $\beta$, and $\gamma$ can be respectively set to 0.2, 0.4, and 0.004 ($\alpha=0.2$, $\beta=0.4$, and $\gamma=0.004$) The weight parameters $\alpha$, $\beta$, and $\gamma$ may be negative numbers.

<Frame Rate Detecting Unit 3>

The frame rate detecting unit 3 analyzes a video signal of the evaluated video y and outputs its frame rate. According to the present invention, it is premised that frame rate of the original video x is equal to or higher than that of the evaluated video y. Due to this, the frame rate detecting unit 3 detects the frame rate of the evaluated video y, which is lower than the frame rate of the original video x.

The frame rate detecting unit 3 outputs the detected frame rate to the frame rate-specific correcting unit 4.

<Frame Rate-Specific Correcting Unit 4>

Figure 6:
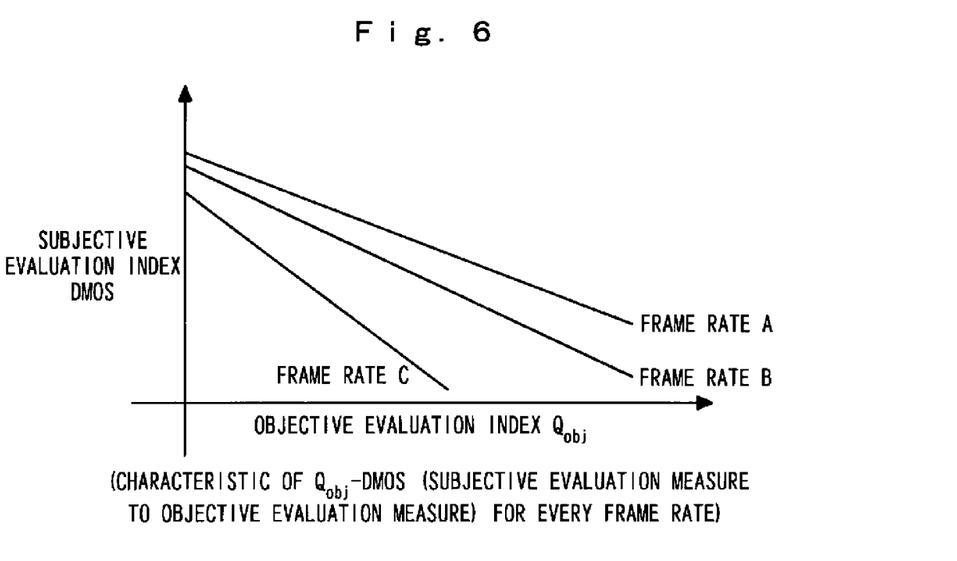
FIG. 6 is a graph showing a characteristic of objective evaluation index to subjective evaluation index for every frame rate.

If a correlation between the objective evaluation index $Q_{obj}$ output from the weighted sum calculating unit 2 and the subjective video quality (DMOS) is obtained, the correlation often differs in characteristics among frame rates a, b, c, etc. as shown in FIG. 6. The automatic objective perceptual video quality evaluation apparatus according to the embodiment is required to output a stable evaluation value without relying on the frame rate. Therefore, the frame rate-specific correction unit 4 absorbs the difference among the frame rates in the characteristic of the subjective evaluation measure to the objective evaluation measure using a correction characteristic (see FIG. 1), and corrects the evaluation value to an objective evaluation value irrespective of the frame rates. The correction method will be described below.

Figure 7:
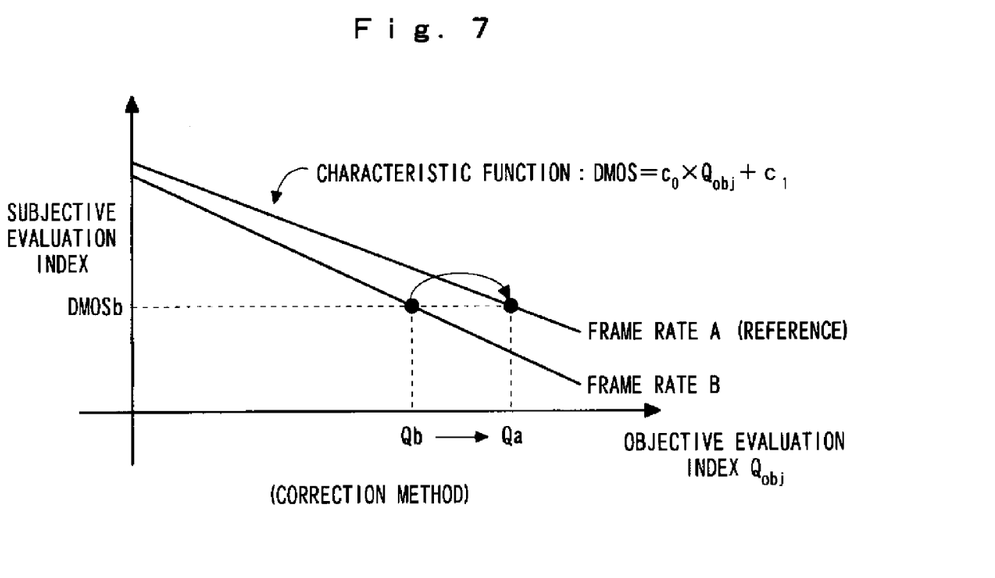
FIG. 7 is a graph showing a method of correcting frame rate of the characteristic of objective evaluation index to subjective evaluation index.

As shown in FIG. 7, a pair of data on a subjective evaluation value of video at the frame rate band data on an objective evaluation value approximated to the subjective evaluation value is set as (Qb, DMOSb), which pair is moved onto a characteristic line $y=c_0 \times Q_{obj}+c_1$ of the frame rate a, based on which line the objective evaluation value is calculated. In this case, an objective evaluation value $Q_a$ is calculated so as to give the subjective evaluation value DMOSb on the characteristic line of the frame rate a. The objective evaluation value $Q_a$ thus obtained is regarded as the corrected objective evaluation value. Namely, a relationship represented by the following equation is obtained.

$$DMOSb = c_0 \times Q_a + c_1$$

The corrected objective evaluation value $Q_a$ is represented by the following equation.

$$Q_a = DMOSb/c_0 - c_1$$

<Objective Evaluation Index-Subjective Video Quality Mapping Unit (Objective Video Quality Estimated Value Deriving Unit) 5>

Figure 8:
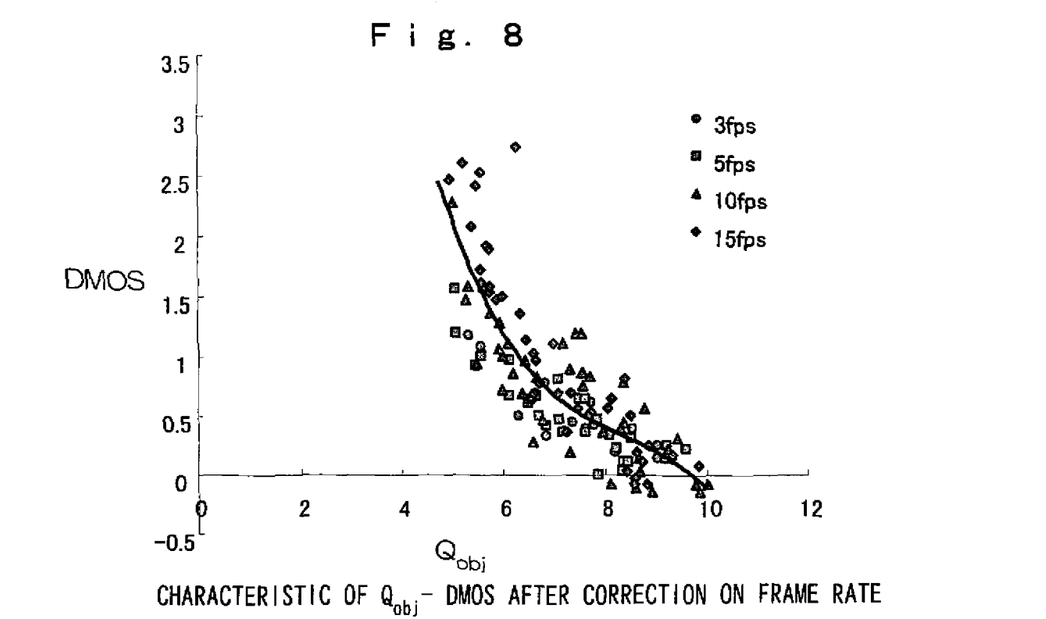
FIG. 8 is a graph showing a characteristic of objective evaluation index to subjective evaluation index after frame rate correction.

Finally, if the relationship between the objective evaluation index $Q_{obj}$ and the subjective evaluation measure DMOS after the frame rate-specific correction is calculated using many samples, the relationship is shown in, for example, FIG. 8. FIG. 8 is a graph showing that the relationship between the objective evaluation index $Q_{obj}$ and the subjective evaluation measure DMOS is calculated using evaluated videos at frame rates of 3 fps (frames per second), 5 fps, 10 fps, and 15 fps. As obvious from FIG. 8, the relationship between the objective evaluation index $Q_{obj}$ and the subjective evaluation measure DMOS can be approximated to a polynomial function.

Figure 9:
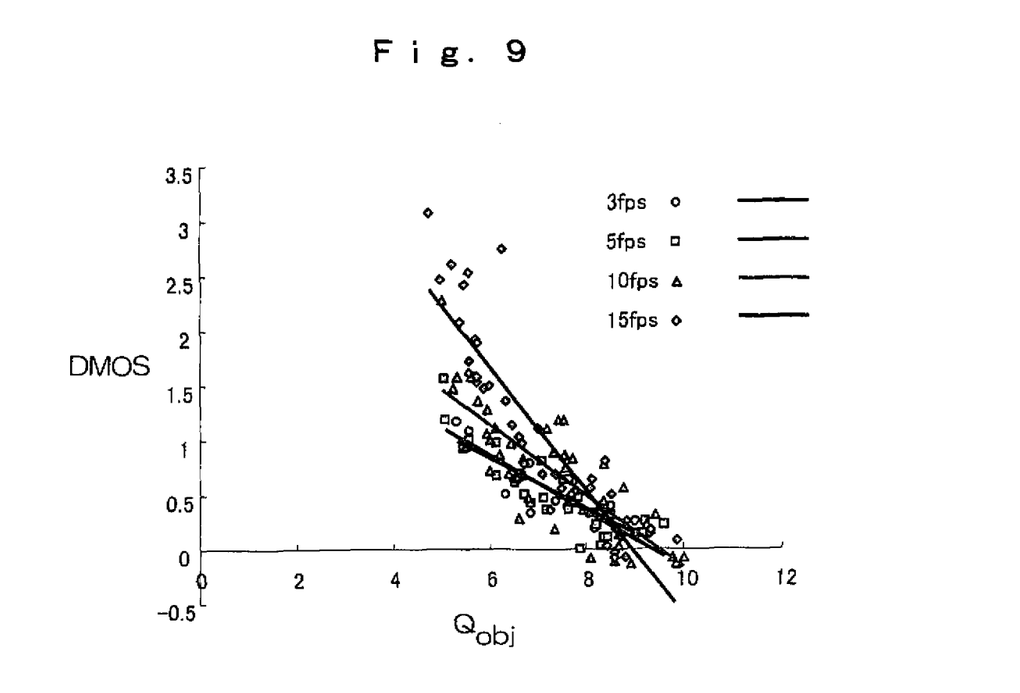
FIG. 9 is a graph showing a regression curve for every frame rate set.

However, if these pieces of data are classified according to the frame rates, it is understood that data sets are irregular among the frame rates. Therefore, as shown in FIG. 9, if a regression curve is obtained for every frame rate, it is understood that regression curves differ in inclination among the frame rates and that data irregularity thereby occurs. Accordingly, the objective evaluation index $Q_{obj}$ is corrected so that the data sets on all the frame rates are on the same line.

Figure 10:
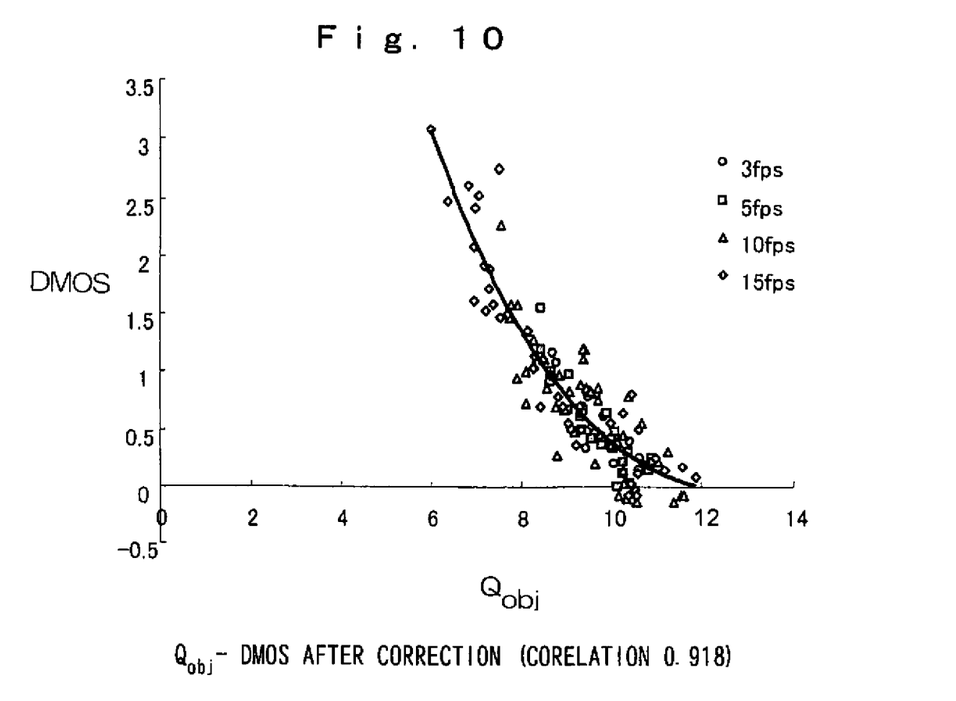
FIG. 10 is a graph showing the characteristic of objective evaluation index to subjective evaluation index after the frame rate is corrected so that data sets of frame rates are on the same line.

FIG. 10 shows $Q_{obj}$-DMOS characteristic after the correction stated above. The relationship between the objective evaluation index $Q_{obj}$ and the subjective evaluation measure DMOS shown in FIG. 10 can be approximated to, for example, a polynomial function represented by the following equation.

$$DMOS = -0.0035x^3 + 0.1776x^2 - 2.8234x + 14.379 \text{ (where } x=Q_{obj})$$

Therefore, this polynomial function is stored in the objective evaluation index-subjective video quality mapping unit (or the subjective video quality estimated value deriving unit) 5 in advance. The corrected objective video quality index $Q_{obj}$ is applied to the polynomial function, thereby deriving the subjective video quality estimated value. Namely, points on a solid-line curve shown in FIG. 10 indicate the estimated subjective video qualities corresponding to the objective video quality index $Q_{obj}$.

As stated so far, according to the present invention, it is possible to estimate the objective video quality of the video at low resolution and low frame rate such as a multimedia video without relaying on subjective human judgment.

Needless to say, the methods of deriving the block distortion degree, the PSNR overall temporal fluctuation degree, and the PSNR local temporal fluctuation degree executed by the feature amount extracting unit 1, and the method of calculating the weighted sum executed by the weighted sum calculating unit 2 are given only for illustrative purposes. The other deriving methods and the other calculation method can be applied to the present invention.

What is claimed is:

1. An objective perceptual video quality evaluation apparatus configured to estimate a subjective video quality by analyzing two types of video signals of an original video and an evaluated video, comprising:
   a central processing unit (CPU);
   said CPU adapted to configure a feature amount extracting processor unit to extract a block distortion degree of the evaluated video relative to the original video, a PSNR overall temporal fluctuation degree for frames in a sequence, and a PSNR local temporal fluctuation degree for each of the frames as feature amounts;
   said CPU adapted to configure an objective video quality index calculating processor unit to calculate a weighted sum of the block distortion degree, the PSNR overall temporal fluctuation degree, and the PSNR local temporal fluctuation degree, and calculating an objective video quality index;
   said CPU adapted to configure frame rate detecting processor unit to detect frame rate of the evaluated video;
   said CPU adapted to configure a correcting processor unit to correct the objective video quality index calculated by the objective video quality index calculating processor unit based on the frame rate detected by the frame rate detecting processor unit; and
   said CPU adapted to configure a subjective video quality estimated value deriving processor unit to derive a subjective video quality estimated value by applying the objective video quality index corrected by the correcting processor unit to a correlation between the subjective video quality index and the objective video quality given in advance,
   wherein said CPU adapted to configure the objective video quality index calculating processor unit to calculate an intra-frame average value of a DC difference among a plurality of pixel blocks of each of the original video and the evaluated video and pixel blocks adjacent to the pixel block of interest, and
   to calculate an intra-sequence maximum difference between the intra-frame average value of the DC difference for the original video and the intra-frame average value of the DC difference for the evaluated video as a maximum value of the DC difference, and
   to calculate an intra-sequence minimum difference between the intra-frame average value of the DC difference for the original video and the intra-frame average value of the DC difference for the evaluated video as a minimum value of the DC difference, and
   to obtain a difference between the maximum value of the DC difference and the minimum value of the DC difference as the block distortion degree.

2. The objective perceptual video quality evaluation apparatus according to claim 1, wherein
   the PSNR overall temporal fluctuation degree is derived based on a ratio of an absolute value of a difference between a maximum value and an average value of an MSE of each of the frames in the sequence to an absolute value of a difference between a minimum value and the average value of the MSE of each of the frames in the sequence.

3. The objective perceptual video quality evaluation apparatus according to claim 2, wherein the ratio of the absolute value of the difference between the maximum value and the average value of the MSE of each of the frames in the sequence to the absolute value of the difference between the minimum value and the average value of the MSE of each of the frames in the sequence is multiplied by a scaling function for changing a value according to an average value of the MSE in the sequence.

4. The objective perceptual video quality evaluation apparatus according to claim 1, wherein
the PSNR local temporal fluctuation degree is an intra-sequence maximum value of a PSNR value of the frame of interest and PSNR values of the adjacent frames before and after the frame of interest.

5. The objective perceptual video quality evaluation apparatus according to claim 4, wherein
the PSNR local temporal fluctuation degree is obtained by multiplying the intra-sequence maximum value of the PSNR difference between the adjacent frames by a scaling function for changing a value according to the MSE value of the frame of interest.

* * * * *